United States Patent
Fujii et al.

(10) Patent No.: US 10,734,854 B2
(45) Date of Patent: Aug. 4, 2020

(54) ROTOR AND MOTOR

(71) Applicants: MITSUBA CORPORATION, Kiryu-shi, Gunma (JP); HONDA MOTOR CO., LTD., Tokyo (JP)

(72) Inventors: Yosuke Fujii, Kiryu (JP); Tohru Yumoto, Kiryu (JP); Taichi Yamamoto, Wako (JP); Susumu Miyazaki, Wako (JP)

(73) Assignees: MITSUBA CORPORATION, Kiryu-Shi (JP); HONDA MOTOR CO., LTD., Tokyo (JP)

( * ) Notice: Subject to any disclaimer, the term of this patent is extended or adjusted under 35 U.S.C. 154(b) by 610 days.

(21) Appl. No.: 15/498,700

(22) Filed: Apr. 27, 2017

(65) Prior Publication Data
US 2017/0317543 A1 Nov. 2, 2017

(30) Foreign Application Priority Data

May 2, 2016 (JP) .................................. 2016-092772
May 2, 2016 (JP) .................................. 2016-092773
May 2, 2016 (JP) .................................. 2016-092774

(51) Int. Cl.
*H02K 1/27* (2006.01)
(52) U.S. Cl.
CPC .......... *H02K 1/2773* (2013.01); *H02K 1/2706* (2013.01); *H02K 1/2766* (2013.01)
(58) Field of Classification Search
CPC .. H02K 1/2773; H02K 1/2786; H02K 1/2706; H02K 1/274; H02K 1/2766; H02K 1/24; H02K 1/228
(Continued)

(56) References Cited

U.S. PATENT DOCUMENTS

2003/0098628 A1* 5/2003 Enomoto ............... H02K 1/187
                                                      310/216.057
2012/0007464 A1* 1/2012 Saito ..................... H02K 1/276
                                                      310/216.051
(Continued)

FOREIGN PATENT DOCUMENTS

JP        S5174705      *  6/1976
JP        S51-127302 A    11/1976
(Continued)

OTHER PUBLICATIONS

Japanese Office Action corresponding to JP Appln. No. 2016-092772, dated Sep. 3, 2019.
(Continued)

*Primary Examiner* — Alfonso Perez Borroto
*Assistant Examiner* — Ahmed Elnakib
(74) *Attorney, Agent, or Firm* — Squire Patton Boggs (US) LLP

(57) ABSTRACT

A rotor includes a rotary shaft having a non-magnetic body, a plurality of rotor cores, and a plurality of permanent magnets disposed between the plurality of rotor cores, wherein a concave section extending in an axial direction is formed in any one of the non-magnetic body and a base end of the rotor core, and a convex section fitted into the concave section is formed at the other, the concave section is formed by a key groove section and a dovetail groove section in communication with each other, the convex section is formed by a key section configured to fit into the key groove section and a dovetail protrusion configured to fit into the dovetail groove section, the key section and the dovetail protrusion being integrally formed with each other, and a gap is formed between the dovetail groove section and the dovetail protrusion in the circumferential direction.

20 Claims, 6 Drawing Sheets

(58) Field of Classification Search
USPC ............ 310/156.01, 156.09, 156.13, 156.21, 310/156.33, 156.48, 156.59, 156.56, 310/216.051, 216.086
See application file for complete search history.

(56) References Cited

U.S. PATENT DOCUMENTS

| | | | |
|---|---|---|---|
| 2012/0187794 A1* | 7/2012 | Inoue | H02K 1/2773 310/181 |
| 2013/0049493 A1* | 2/2013 | Zhao | H02K 1/2773 310/43 |
| 2014/0103769 A1* | 4/2014 | Kingrey | H02K 21/16 310/156.12 |
| 2014/0103770 A1 | 4/2014 | Brahmavar | |
| 2014/0111052 A1* | 4/2014 | Wu | H02K 1/2766 310/156.28 |
| 2016/0006303 A1 | 1/2016 | Hoemann et al. | |
| 2017/0317543 A1* | 11/2017 | Fujii | H02K 1/2773 |

FOREIGN PATENT DOCUMENTS

| | | | |
|---|---|---|---|
| JP | 60-098836 A | | 6/1985 |
| JP | S62131743 | * | 6/1987 |
| JP | 2006-081384 A | | 3/2006 |
| JP | 2014-180096 A | | 9/2014 |
| KR | 10-2016-0033433 A | | 3/2016 |

OTHER PUBLICATIONS

Japanese Office Action corresponding to JP Appln. No. 2016-092773, dated Sep. 3, 2019.
Japanese Office Action corresponding to JP Appln. No. 2016-092774, dated Sep. 3, 2019.

* cited by examiner

ROTOR AND MOTOR

CROSS-REFERENCE TO RELATED APPLICATION

Priority is claimed on Japanese Patent Application Nos. 2016-092772, 2016-092773 and 2016-092774, which are filed May 2, 2016, the contents of which are incorporated herein by reference.

BACKGROUND

Field of the Invention

The present invention relates to a rotor and a motor.

Description of Related Art

In the related art, an interior permanent magnet (IPM) motor in which permanent magnets are imbedded in a magnetic rotor core that constitutes a rotor is known as a type of a motor. In such a motor, since a magnetic body (a rotor core) is between the permanent magnets neighboring in a circumferential direction, a quantity of magnetic flux, which bypasses the rotor core side among the quantity of magnetic flux from the permanent magnet, is increased and as a result, a leakage flux is increased. For this reason, the magnetic flux interlinked with a winding wound on the stator may be reduced, and there is a possibility that the motor properties are decreased. Accordingly, various technologies for preventing deterioration in motor properties in an IPM motor have been disclosed.

For example, the rotor is constituted by a rotary shaft, a cylindrical non-magnetic body fitted onto an outer circumferential surface of the rotary shaft, a plurality of magnetic rotor cores radially disposed on an outer circumferential surface of the non-magnetic body, and a plurality of permanent magnets radially disposed on the outer circumferential surface of the non-magnetic body and disposed between the rotor cores neighboring in a circumferential direction (for example, Japanese Unexamined Patent Application, First Publication No. 2014-180096).

Here, in Japanese Unexamined Patent Application, First Publication No. 2014-180096, fixing of the rotor cores to the non-magnetic body is performed by fitting dovetail protrusions formed at base ends of the rotor cores into dovetail groove sections formed in an outer circumferential surface of the non-magnetic body.

In addition, here, each of the rotor cores is formed in substantially a fan shape when seen in a plan view in an axial direction. Accordingly, opposite side surfaces of the rotor cores neighboring each other are substantially parallel to each other, and the permanent magnet can have a plate shape. For this reason, manufacturing cost of the permanent magnet can be suppressed as much as possible. The permanent magnet formed in this way is fixed to each of the rotor cores using an adhesive agent.

SUMMARY

Incidentally, it is difficult to sufficiently secure fixing strength of the rotor core to the non-magnetic body by merely fitting the dovetail groove section and dovetail protrusion because a torque load or the like applied to the rotor core is received by the dovetail groove section and the dovetail protrusion. In particular, in a small motor, strength of a fitting place between the dovetail groove section and the dovetail protrusion may be decreased. For this reason, not only the permanent magnet is unable to be reliably held by the rotor core but the rotor core may also fall off from the rotary shaft due to a centrifugal force applied to the rotor core. In addition, when strength of the fitting place between the dovetail groove section and the dovetail protrusion is secured, the motor may be increased in size as a whole. Further, in fitting the dovetail protrusion into the dovetail groove section, it is difficult to precisely assemble the rotor core.

In addition, it is difficult to process the dovetail groove section or the dovetail protrusion with high precision due to difficulty in processing. For this reason, in fitting the dovetail protrusion into the dovetail groove section, a protrusion length of the rotor core with respect to the rotary shaft may vary. As a result, motor performance may be decreased.

In addition, when the permanent magnet is fixed to the rotor core using an adhesive agent and an adhesion error or the like occurs, due to the centrifugal force, the permanent magnet may fall out in the radial direction of the rotor core.

An aspect of the present invention provides a rotor and a motor capable of strongly fixing a rotor core and precisely assembling the rotor core while preventing an increase in size.

In addition, an aspect of the present invention provides a rotor and a motor capable of suppressing a variation in protrusion length of a rotor core with respect to a rotary shaft and improving motor performance.

In addition, an aspect of the present invention provides a rotor and a motor capable of preventing a permanent magnet from falling out in a radial direction of the rotor core.

A rotor according to an aspect of the present invention includes a rotary shaft having a non-magnetic body formed at least at an outer circumferential surface thereof; a plurality of rotor cores that is attached to the outer circumferential surface of the rotary shaft and that is radially disposed; and a plurality of permanent magnets disposed between the plurality of rotor cores, wherein a concave section extending in an axial direction is formed in any one of the non-magnetic body and a base end of the rotor core, and a convex section configured to fit into the concave section is formed at the other one of the non-magnetic body and the base end of the rotor core, the concave section is formed by a key groove section and a dovetail groove section in communication with each other, the key groove section being formed so that surfaces thereof facing to each other in a circumferential direction are parallel with each other, the dovetail groove section being formed to have a shape that widens inward or outward in a radial direction, the convex section is formed by a key section configured to fit into the key groove section and a dovetail protrusion configured to fit into the dovetail groove section, the key section and the dovetail protrusion being integrally formed with each other, and a gap is formed between the dovetail groove section and the dovetail protrusion in the circumferential direction.

In this case, positioning of the rotor core with respect to the rotary shaft can be precisely performed by fitting the key section into the key groove section. In addition, as a gap is formed between the dovetail groove section and the dovetail protrusion, a manufacturing error between the dovetail groove section and the dovetail protrusion can be absorbed by the gap. For this reason, application of an unnecessary load to the key groove section and the key section can be prevented, and positioning of the rotor core with respect to the rotary shaft can be reliably performed by the key groove section and the key section.

In addition, falling of the rotor core from the rotary shaft can be prevented by fitting of the dovetail protrusion into the dovetail groove section, and the rotor core can be fixed to the rotary shaft. In addition, since a torque load applied to the rotor core can be received by the key groove section and the key section, fixing strength of the rotor core to the rotary shaft can be increased.

In the rotor according to the aspect of the present invention, the gap may be filled with a filler.

In this case, fixing strength of the rotor core to the rotary shaft can be further increased.

In the rotor according to the aspect of the present invention, the concave section may be formed in the non-magnetic body, the key groove section may be formed at an opening side of the concave section, and the dovetail groove section may be formed at an inner side of the key groove section in the radial direction.

Here, when the concave section is formed closer to the rotary shaft compared to when the concave section is formed at the rotor core side, since the convex section is formed at the rotor core side, stiffness of the rotor core is more easily increased than when the concave section is formed at the rotor core side. Since the rotor core has stiffness smaller than that of the rotary shaft, as the concave section is formed at the rotary shaft side, fixing strength of the rotor core to the rotary shaft can be effectively increased.

In addition, as the key groove section is formed at the opening side of the concave section and the dovetail groove section is formed at an inner side of the key groove section in the radial direction, the concave section can be easily formed. Further, a torque load applied to the rotor core can be easily received by the key groove section and the key section.

In the rotor according to the aspect of the present invention, a rotor core retaining section configured to prevent the rotor core from falling from the rotary shaft in the radial direction may be formed at the rotor core.

In this case, falling of the rotor core from the rotary shaft can be reliably prevented by a centrifugal force applied to the rotor core.

In the rotor according to the aspect of the present invention, the rotor core retaining section may be a constricted section formed at a root portion of the convex section of the rotor core such that a width in the circumferential direction is reduced to be narrower than the key section of the convex section, and corner sections of the permanent magnet may be disposed at the constricted section.

In this case, falling of the rotor core from the rotary shaft in the radial direction can be easily prevented using the permanent magnet.

In the rotor according to the aspect of the present invention, an adjusting allowance, which allows a movement of the convex section in the radial direction inside the concave section, may be formed at least are one of the concave section and the convex section.

In this case, a protrusion length of the rotor core with respect to the rotary shaft can be adjusted while movement of the rotor core with respect to the rotary shaft in the circumferential direction is restricted by the key groove section and the key section. For this reason, a variation in protrusion length of the rotor core with respect to the rotary shaft can be suppressed as much as possible and motor performance can be improved.

In the rotor according to the aspect of the present invention, a length of the key section may be set to be larger than a groove depth of the key groove section, a groove depth of the dovetail groove section may be set to be larger than a protrusion height of the dovetail protrusion, and each of a length difference between the length of the key section and the groove depth of the key groove section and a length difference between the groove depth of the dovetail groove section and the protrusion height of the dovetail protrusion may serve as an adjusting allowance.

In this case, a groove depth of the key groove section may be set to be larger than a length of the key section, and a protrusion height of the dovetail protrusion may be set to be larger than a groove depth of the dovetail groove section. For this reason, each of a length difference between the length of the key section and the groove depth of the key groove section and a length difference between the groove depth of the dovetail groove section and the protrusion height of the dovetail protrusion may serve as an adjusting allowance.

In this case, the adjusting allowance can be easily provided. For this reason, motor performance can be improved while suppressing an increase in manufacturing cost.

In addition, since a manufacturing error of the dovetail groove section and the dovetail protrusion can be absorbed by the gap in the dovetail groove or the key groove section, application of an unnecessary load to the key groove section and the key section can be prevented, and positioning of the rotor core with respect to the rotary shaft can be more reliably performed.

The rotor according to the aspect of the present invention, a permanent magnet retaining section configured to prevent the permanent magnet from falling out in the radial direction may be formed at a tip of the rotor core.

In this case, falling of the permanent magnet outward in the radial direction can be prevented by the permanent magnet retaining section.

In the rotor according to the aspect of the present invention, a claw section extending in the circumferential direction may be formed at least at one of both edges in the circumferential direction at a tip of the rotor core, and the claw section may function as the permanent magnet retaining section.

In this case, the permanent magnet retaining section can be formed in a simple structure, and manufacturing cost can be reduced. In addition, an increase in size of the rotor can be suppressed.

In the rotor according to the aspect of the present invention, an outer circumferential surface of the claw section may be formed concentrically with an outer circumferential surface of the rotary shaft.

In this case, extending of the claw section inside in the radial direction between the neighboring rotor cores can be suppressed as much as possible. For this reason, a length of the permanent magnet in the radial direction can be sufficiently secured, and effective magnetic flux of the permanent magnet can be sufficiently secured.

In the rotor according to the aspect of the present invention, an outer end of the permanent magnet in the radial direction may abut the claw section.

In this case, even when a centrifugal force acting upon rotation of the rotor is applied to the permanent magnet, deviation of the permanent magnet outward in the radial direction can be prevented. For this reason, quality of the rotor can be stabilized.

In the rotor according to the aspect of the present invention, an inner end of the permanent magnet in the radial direction may abut an outer circumferential surface of the rotary shaft.

In this case, as the permanent magnet is pushed toward the rotary shaft from the outside in the radial direction, positioning of the permanent magnet can be completed. Accordingly, positioning of the permanent magnet can be easily performed.

A motor according to an aspect of the present invention may include the rotor and a stator formed to surround the rotor and on which a winding is wound.

In this case, it is possible to provide a motor capable of strongly fixing the rotor core while preventing an increase in size, and precisely assembling the rotor core.

In addition, it is possible to provide a motor capable of suppressing a variation in protrusion length of the rotor core with respect to the rotary shaft as much as possible, and improving motor performance.

In addition, it is possible to provide a motor capable of preventing the permanent magnet from falling out in the radial direction of the rotor core.

According to the aspect of the present invention, positioning of the rotor core with respect to the rotary shaft can be precisely performed by fitting the key section into the key groove section. In addition, as the gap is formed between the dovetail groove section and the dovetail protrusion, a manufacturing error of the dovetail groove section and the dovetail protrusion can be absorbed by the gap. For this reason, application of an unnecessary load to the key groove section and the key section can be prevented, and positioning of the rotor core with respect to the rotary shaft can be reliably performed by the key groove section and the key section.

In addition, as the dovetail protrusion is fitted into the dovetail groove section, falling of the rotor core from the rotary shaft can be prevented, and the rotor core can be fixed to the rotary shaft. In addition, since a torque load applied to the rotor core can be received by the key groove section and the key section, fixing strength of the rotor core to the rotary shaft can be increased.

In addition, a protrusion length of the rotor core with respect to the rotary shaft can be adjusted while movement of the rotor core with respect to the rotary shaft in the circumferential direction is restricted by the key groove section and the key section. For this reason, a variation in protrusion length of the rotor core with respect to the rotary shaft can be suppressed as much as possible and motor performance can be improved.

In addition, falling of the permanent magnet outward in the radial direction can be prevented by the permanent magnet retaining section.

DESCRIPTION OF EMBODIMENTS

Next, embodiments of aspects of the present invention will be described with reference to the accompanying drawings.

First Embodiment (Brushless Motor)

Figure 1:
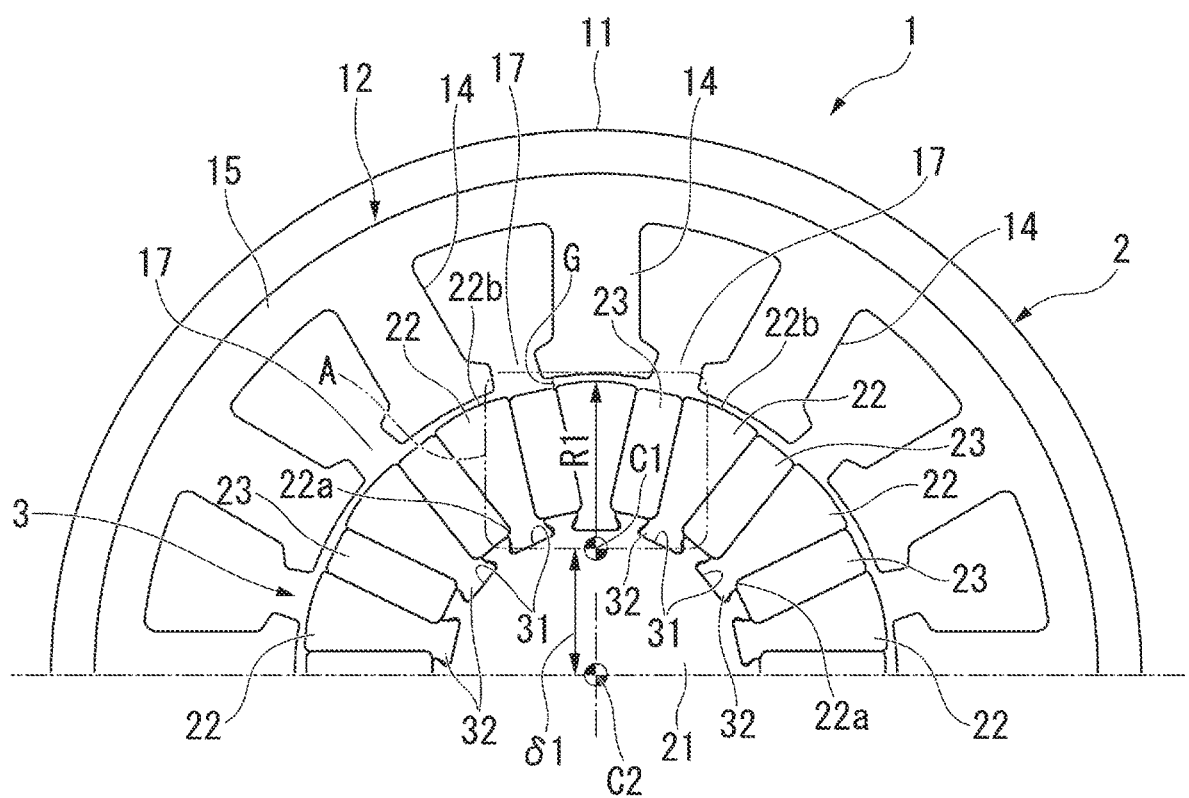
FIG. 1 is a schematic configuration view of a brushless motor according to a first embodiment of an aspect of the present invention.

FIG. 1 is a schematic configuration view of a brushless motor 1.

As shown in FIG. 1, the brushless motor 1 is a so-called inner rotor. The brushless motor 1 has a stator 2 and a rotor 3 rotatably disposed inside the stator 2 in a radial direction.

Further, in the following description, an axial direction of the rotor 3 is simply referred to as an axial direction, a rotational direction of the rotor 3 is referred to as a circumferential direction, and a radial direction of the rotor 3 is simply referred to as a radial direction.

(Stator)

The stator 2 is constituted by a substantially cylindrical stator housing 11 and a substantially cylindrical stator core 12 fitted into and fixed in the stator housing 11.

The stator core 12 has an annular core main body 15 that forms an outer circumferential section. The core main body 15 is a portion that forms an annular magnetic path of the stator core 12. An outer circumferential surface of the core main body 15 is fixed to an inner circumferential surface of the stator housing 11 by shrinkage fitting or the like.

A plurality of (for example, in the embodiment, 12) tooth sections 14 directed inward in the radial direction protrude from the core main body 15 at equal intervals in the circumferential direction. Each of the tooth sections 14 is formed in substantially a T shape when seen in a plan view in the axial direction. Coils (not shown) are wound on each of the tooth sections 14 in a state in which an insulator formed of an insulating resin is mounted.

In addition, slots 17 having a dovetail groove shape extending in the axial direction are formed between the tooth sections 14 neighboring in the circumferential direction. The coils (not shown) are inserted through and received in the slots 17.

A terminal section of each of the coils is electrically connected to an external power supply via a board (not shown), and thus current is supplied to the coil. As the current is supplied to the coil, a magnetic field is formed on each of the tooth sections 14.

Further, the stator core 12 may be configured by bonding a plurality of core units having the tooth sections 14 divided in the circumferential direction to each other, or may be integrally formed without dividing the stator core in the circumferential direction.

(Rotor)

Figure 2:
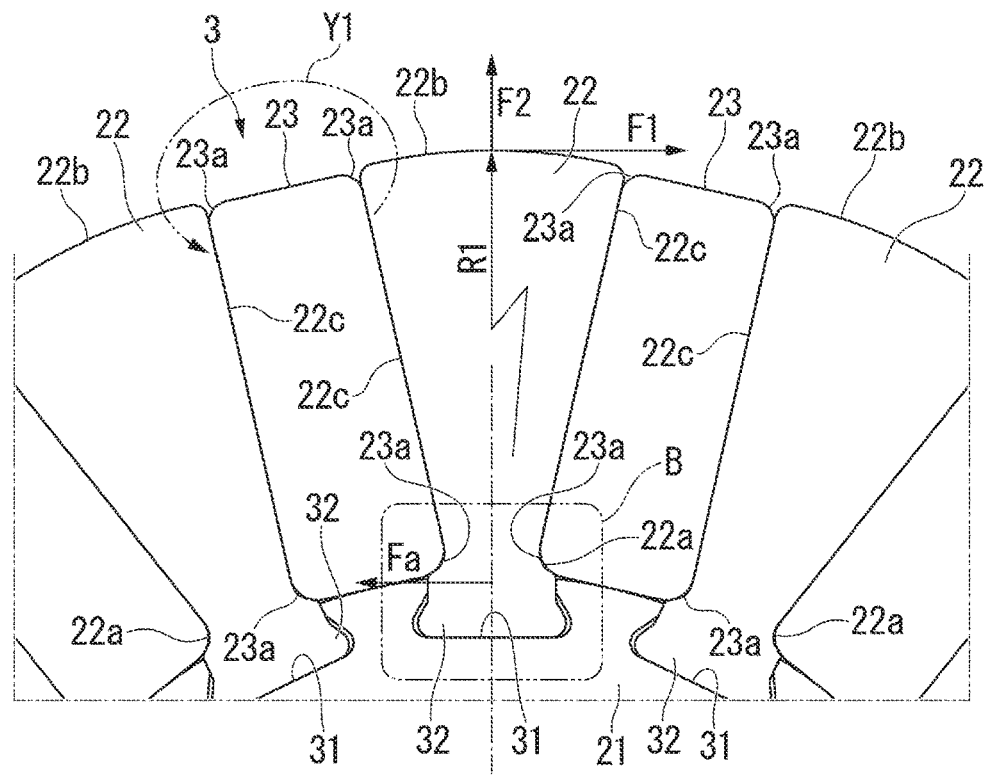
FIG. 2 is an enlarged view of a portion A of FIG. 1.

FIG. 2 is an enlarged view of a portion A of FIG. 1.

As shown in FIG. 1 and FIG. 2, the rotor 3 is constituted by a rotary shaft 21 formed of a non-magnetic material such as an aluminum sintered material or the like, a plurality of rotor cores 22 attached to and radially disposed on the outer circumferential surface of the rotary shaft 21, and a plurality of permanent magnets 23 disposed between the rotor cores 22 neighboring in the circumferential direction.

The rotor cores 22 are formed by stacking a plurality of electromagnetic steel sheets and pressing a soft magnetic powder. Each of the rotor cores 22 is formed in substantially a fan shape to be widened to the end toward an outer end in the radial direction (hereinafter referred to as a tip 22b) from an outer circumferential surface side (hereinafter referred to as a base end 22a side) of the rotary shaft 21 when seen in a plan view in the axial direction. The tip 22b of each of the rotor cores 22 is formed in an arc shape to swell outward in the radial direction.

Here, a center C1 of a radius of curvature R1 of the tip 22b of the rotor core 22 is eccentric with respect to an axial center C2 of the rotary shaft 21 by a predetermined interval $\delta 1$. For this reason, an air gap G between the tip 22b of the rotor core 22 and the tip of the tooth section 14 of the stator core 12 is gradually widened from a center of the tip 22b in the circumferential direction toward the outside of the tip 22b in the circumferential direction.

In addition, a concave section 31 is formed in the axial direction at a position among the outer circumferential surface of the rotary shaft 21 corresponding to each of the rotor cores 22. Meanwhile, a convex section 32 fitted into the concave section 31 is formed at the base end 22a of each of the rotor cores 22 throughout the axial direction.

(Concave Section and Convex Section)

Figure 3:
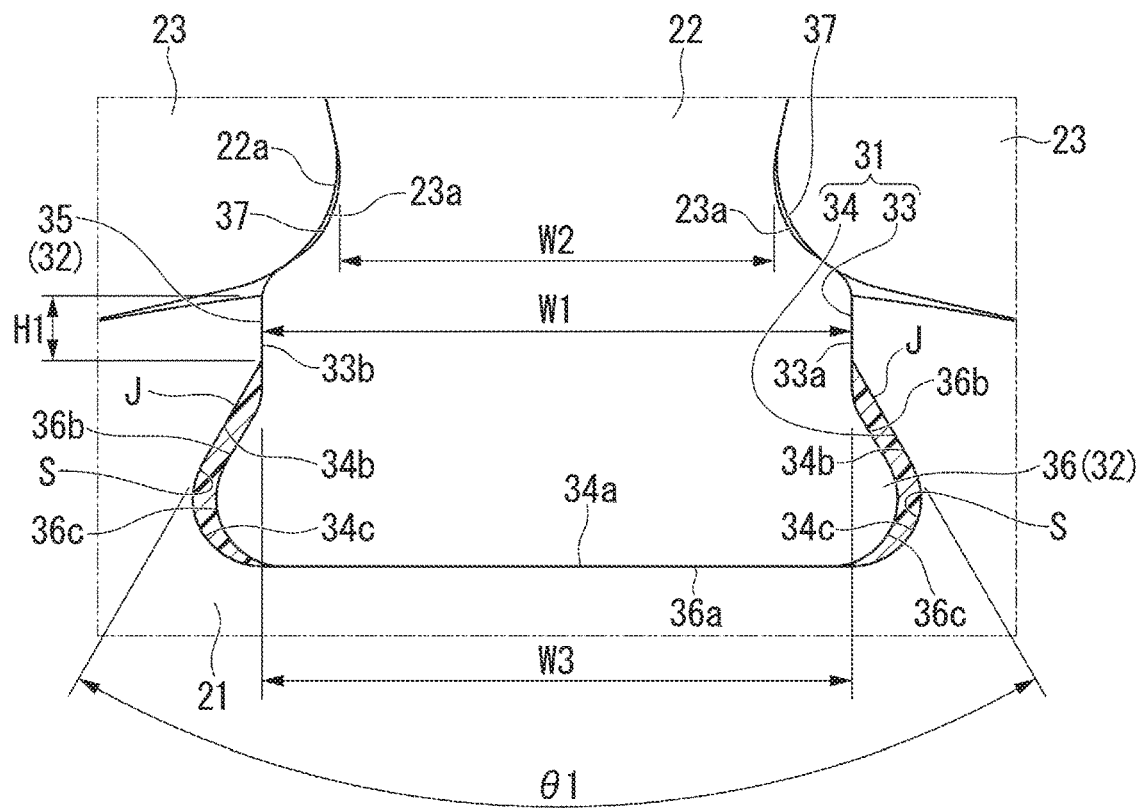
FIG. 3 is an enlarged view of a portion B of FIG. 2.

FIG. 3 is an enlarged view of a portion B of FIG. 2.

As shown in FIG. 3, the concave section 31 is a section in which a key groove section 33 formed at an opening side is in communication with a dovetail groove section 34 formed inside the key groove section 33 in the radial direction. The key groove section 33 is formed such that inner surfaces 33a and 33b opposite to each other in the circumferential direction are substantially parallel to each other. In addition, a width W1 between the inner surfaces 33a and 33b is set to be larger than a width W2 of the base end 22a of the rotor core 22 in the circumferential direction.

The dovetail groove section 34 is formed in a shape that widens to the end such that a groove width is gradually increased from an inner end of the key groove section 33 in the radial direction toward the inside in the radial direction. In other words, the dovetail groove section 34 is formed in a substantial isosceles trapezoidal shape when seen in a plan view in the axial direction, and a length of a top base is set to be the same as the width of the key groove section 33. In addition, corner sections 34c configured to connect a lower base 34a of the dovetail groove section 34 and legs 34b are formed in an arc shape.

Meanwhile, the convex section 32 is configured by integrally forming a key section 35 fitted into the key groove section 33 and a dovetail protrusion 36 fitted into the dovetail groove section 34. The key section 35 is formed in a rectangular parallelepiped shape to correspond to the key groove section 33. A width W3 of the key section 35 is set to be substantially the same as the width W1 of the key groove section 33. Accordingly, positioning of the rotor cores 22 with respect to the rotary shaft 21 in the circumferential direction can be precisely performed.

In this way, since the width W3 of the key section 35 is set to be larger than the width W2 of the base end 22a of the rotor cores 22 in the circumferential direction, constricted sections 37 are formed at connecting sections between the base ends 22a of the rotor cores 22 and the convex sections 32 at both sides of the rotor cores 22 in the circumferential direction.

The dovetail protrusion 36 is formed in a shape that widens to the end to correspond to the dovetail groove section 34 such that a protrusion width is gradually increased inward in the radial direction. In other words, the dovetail protrusion 36 is formed in a substantial isosceles trapezoidal shape when seen in a plan view in the axial direction, and a length of the top base is set to be the same as the width of the key section 35. In addition, corner sections 36c configured to connect a lower base 36a of the dovetail protrusion 36 and legs 36b are round-chambered.

Here, in a state in which the convex section 32 of the rotor cores 22 is fitted into the concave section 31 of the rotary shaft 21, the lower base 36a of the dovetail protrusion 36 abuts the lower base 34a of the dovetail groove section 34. Accordingly, positioning of the rotor cores 22 with respect to the rotary shaft 21 in the radial direction is precisely performed.

In addition, gaps S are formed between the legs 34b of the dovetail groove section 34 and the legs 36b of the dovetail protrusion 36 and between the corner sections 34c of the dovetail groove section 34 and the corner sections 36c of the dovetail protrusion 36. The gaps S are filled with filler J. That is, the gaps S have a role of absorbing a manufacturing error of the dovetail groove section 34 and the dovetail protrusion 36, and function as filling sections filled with the filler J.

Further, a filling timing of the filler J may be after the convex section 32 of the rotor cores 22 is fitted into the concave section 31 of the rotary shaft 21, and the convex section 32 may be fitted into the concave section 31 in a state in which the filler J is previously applied to at least one of the concave section 31 and the convex section 32. In addition, an adhesive agent, a resin, or the like, may be used as the filler J.

With such a configuration, when the rotor 3 is rotated, as shown in FIG. 2, a force F1 (a tip-tipping force F1) caused by an inertial force is applied to the tips 22b of the rotor cores 22 and becomes a torque load, and a force Fa is applied to the base end 22a side of the rotor cores 22. In addition, a centrifugal force F2 is applied to the rotor cores 22. Further, a magnetic attraction force caused by a magnetic field formed at the tooth sections 14 of the stator 2 is applied. A resultant force (hereinafter referred to as a load applied to the concave section 31) of the force Fa, the centrifugal force F2 and the magnetic attraction force is received in the concave section 31 of the rotary shaft 21. Accordingly, a depth H1 of the key groove section 33 that constitutes the concave section 31 and an angle $\theta 1$ between the legs 34b of the dovetail groove section 34 are determined on the basis of the load applied to the concave section 31.

As shown in FIG. 2 and FIG. 3, as the rotor cores 22 are formed in a fan shape, opposite side surfaces 22c of the rotor cores 22 neighboring each other are substantially parallel to each other. The permanent magnets 23 disposed between the rotor cores 22 are formed in a flat plate shape, and joined and fixed to the rotor cores 22 and the rotary shaft 21 by an adhesive agent. Further, a cold setting epoxy type is used as the adhesive agent. Accordingly, demagnetization of the permanent magnets 23 can also be prevented. However, since the cold setting adhesive agent requires a long curing time, an anaerobiotic adhesive agent having a small curing time and high adhesion strength may be used.

In addition, each of the permanent magnets 23 has round-chamfered sections 23a formed at four corners of an outer circumference when seen in the axial direction. The two round-chamfered sections 23a of the inner ends of the permanent magnets 23 in the radial direction are disposed at the constricted sections 37 of the rotor cores 22.

For this reason, while the magnetic flux tends to wrap around the other surface side in the thickness direction from one surface of the permanent magnets 23 in the thickness direction at both ends of the permanent magnet 23 in the radial direction (see an arrow Y1 in FIG. 2), wraparound of the magnetic flux is prevented because the magnetic path is cut off.

Meanwhile, since the inner end of the permanent magnet 23 in the radial direction abuts the rotary shaft 21 formed of a non-magnetic material, the magnetic path is cut off. For this reason, wraparound of the magnetic flux from one side in the thickness direction to the other side in the thickness direction of the permanent magnet 23 is prevented.

In this way, in the above-mentioned first embodiment, while the concave sections 31 are formed in the rotary shaft 21, the rotor cores 22 are fixed to the rotary shaft 21 by forming the convex sections 32 in the rotor cores 22 and fitting the convex sections 32 into the concave sections 31. Then, while each of the concave sections 31 is constituted by the key groove section 33 and the dovetail groove section 34, the convex section 32 is constituted by the key section 35 and the dovetail protrusion 36 to correspond to the concave section 31. For this reason, positioning of the rotor cores 22 with respect to the rotary shaft 21 can be precisely performed by the key groove sections 33 and the key sections 35.

In addition, the gaps S are formed between the legs 34b of the dovetail groove section 34 and the legs 36b of the dovetail protrusion 36 and between the corner sections 34c of the dovetail groove section 34 and the corner sections 36c of the dovetail protrusion 36. For this reason, a manufacturing error of the dovetail groove section 34 and the dovetail protrusion 36 can be absorbed by the gaps S. Accordingly, application of an unnecessary load to the key groove section 33 and the key section 35 can be prevented, and positioning of the rotor cores 22 by the key groove section 33 and the key section 35 can be reliably performed.

In addition, falling of the rotor cores 22 from the rotary shaft 21 can be prevented by fitting the dovetail protrusion 36 into the dovetail groove section 34, and the rotor cores 22 can be reliably fixed to the rotary shaft 21. In addition, since a load to the concave section 31 can be efficiently received by the key groove section 33 and the key section 35, and the dovetail groove section 34 and the dovetail protrusion 36, fixing strength of the rotor cores 22 to the rotary shaft 21 can be increased.

In addition, as the gaps S formed between the concave sections 31 and the convex sections 32 are filled with the filler J, fixing strength of the rotor cores 22 to the rotary shaft 21 can be further increased.

Further, as the concave sections 31 are formed in the rotary shaft 21 and the convex sections 32 are formed at the rotor cores 22, stiffness of the rotary shaft 21 or the rotor cores 22 is easily secured. That is, since the rotary shaft 21 has stiffness higher than that of the rotor cores 22, the concave sections 31 are formed in the rotary shaft 21. On the other hand, as the convex sections 32 are formed in the rotor cores 22 having stiffness that is likely to be lower than that of the rotary shaft 21, stiffness of the rotor cores 22 can be increased. As a result, fixing strength of the rotor cores 22 to the rotary shaft 21 can be increased.

In addition, in the key groove section 33 and the dovetail groove section 34 that constitute the concave section 31, the key groove section 33 is disposed at an opening side of the concave section 31, and the dovetail groove section 34 is disposed inside the key groove section 33 in the radial direction. For this reason, in comparison with the case in which the dovetail groove section 34 is formed at the opening side of the concave section 31, the concave section 31 can be easily formed. Further, a torque load applied to the rotor core 22 can be easily received by the key groove section 33 and the key section 35.

In addition, the constricted sections 37 are formed at the base ends 22a of the rotor cores 22, and the two round-chamfered sections 23a of the inner ends of the permanent magnet 23 in the radial direction are disposed at the constricted sections 37. For this reason, the constricted sections 37 of the permanent magnets 23 or the rotor cores 22 function as a rotor core retaining section configured to prevent the rotor cores 22 from falling out in the radial direction. For this reason, the rotor cores 22 can be reliably prevented from falling out of the rotary shaft 21 due to the centrifugal force F2 applied to the rotor cores 22.

Further, the center C1 of the radius of curvature R1 of the tip 22b of the rotor core 22 is eccentric with respect to the axial center C2 of the rotary shaft 21 by the predetermined interval δ1. For this reason, the air gap G between the tip 22b of the rotor core 22 and the tip of the tooth section 14 of the stator core 12 is gradually increased from the center of the tip 22b in the circumferential direction toward the outside in the circumferential direction of the tip 22b. Accordingly, the magnetic flux on the outer circumferential surface of the rotor core 22 in the circumferential direction can be varied as smoothly as possible, and a cogging torque can be reduced.

Second Embodiment

Next, a second embodiment will be described with reference to FIG. 4 and FIG. 5.

Figure 4:
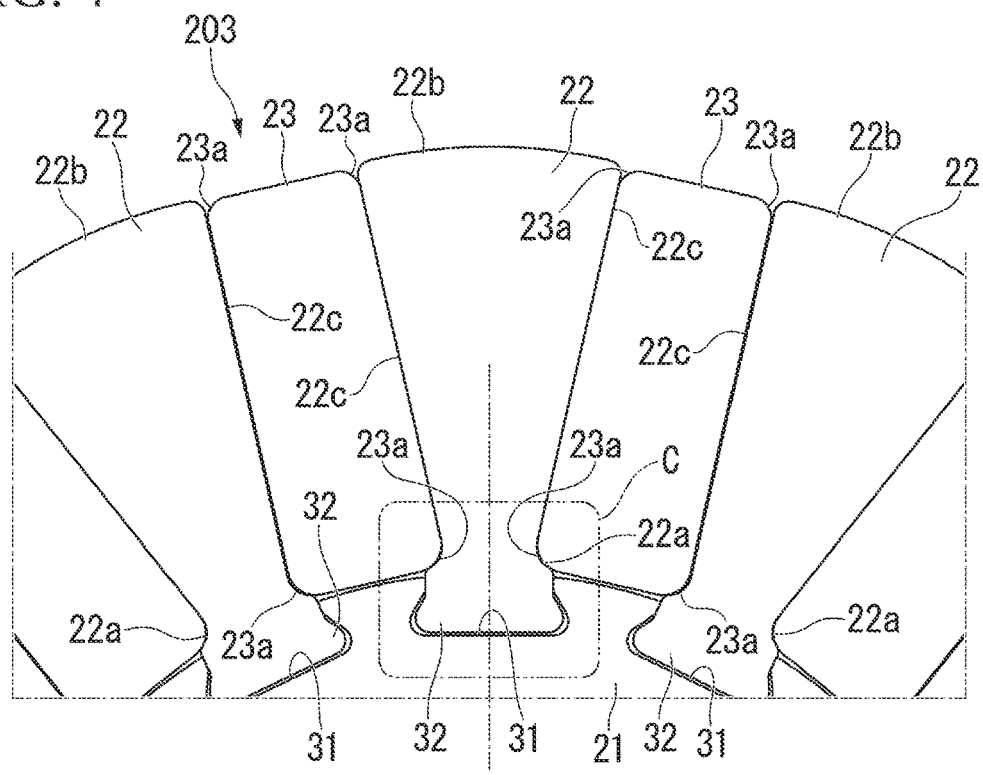
FIG. 4 is an enlarged schematic configuration view of a portion of a rotor according to a second embodiment of an aspect of the present invention.

FIG. 4 is an enlarged schematic configuration view of a portion of a rotor 203 according to the second embodiment, corresponding to FIG. 2. FIG. 5 is an enlarged view of a portion C of FIG. 4. Further, in the same aspect as the first embodiment, description of the same reference numerals will be omitted (also the same as in the following embodiments).

Figure 5:
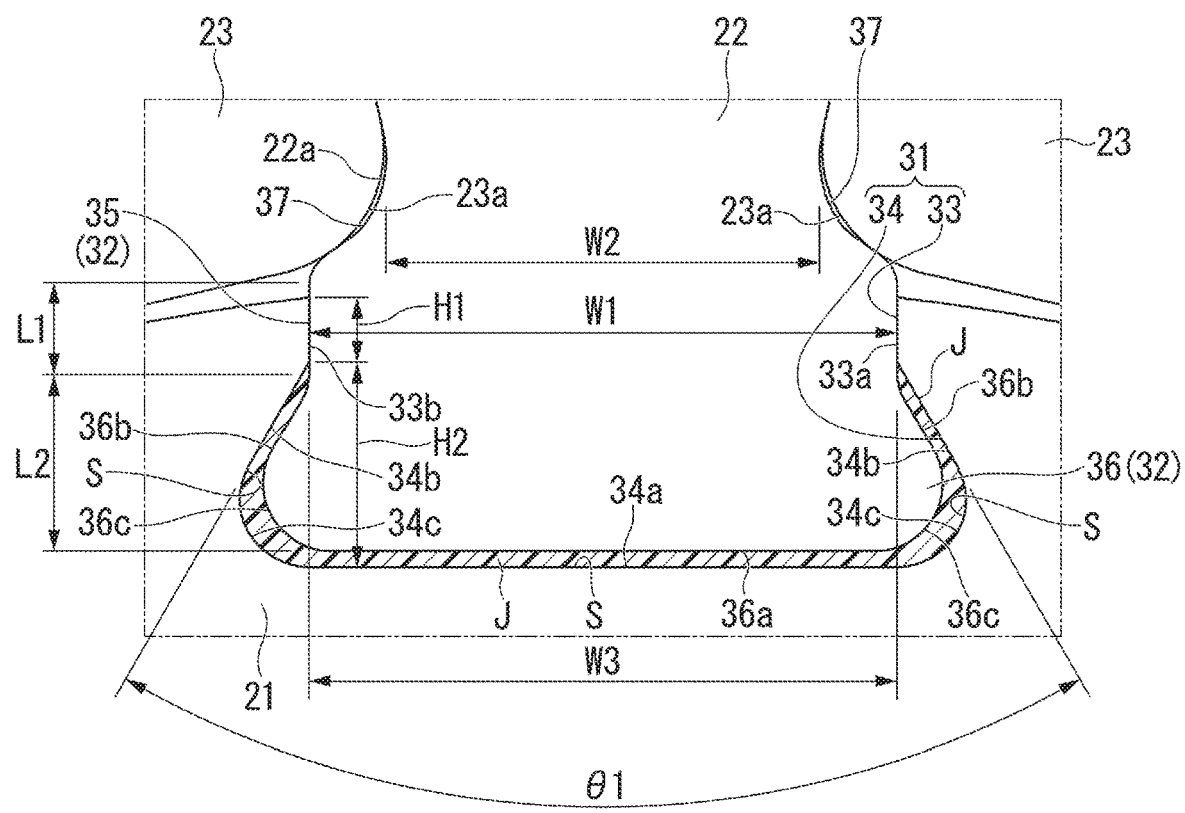
FIG. 5 is an enlarged view of a portion C of FIG. 4.

As shown in FIG. 4 and FIG. 5, in the second embodiment, the gap S is also formed between the lower base 34a of the dovetail groove section 34 formed in the rotary shaft 21 and the lower base 36a of the dovetail protrusion 36 formed at the rotor core 22. Further, the gaps S are formed between the legs 34b of the dovetail groove section 34 and the legs 36b of the dovetail protrusion 36, between the corner sections 34c of the dovetail groove section 34 and the corner sections 36c of the dovetail protrusion 36 and between the lower base 34a of the dovetail groove section 34 and the lower base 36a of the dovetail protrusion 36. This is a different point between the first embodiment and the second embodiment.

In other words, a length L1 of the key section 35 of the convex section 32 is set to be larger than a groove depth H1 of the key groove section 33 of the concave section 31, and a groove depth H2 of the dovetail groove section 34 of the concave section 31 is set to be larger than a length L2 of the dovetail protrusion 36 of the convex section 32. Then, the gaps S are formed between the legs 34b of the dovetail groove section 34 and the legs 36b of the dovetail protrusion 36, between the corner sections 34c of the dovetail groove section 34 and the corner sections 36c of the dovetail protrusion 36 and between the lower base 34a of the dovetail groove section 34 and the lower base 36a of the dovetail protrusion 36.

With such a configuration, the rotor cores 22 are configured to be slightly slidably movable with respect to the rotary shaft 21 in the radial direction. In this case, the gap S formed between the concave section 31 and the convex section 32 has a role as an adjusting allowance by which a position (a protrusion length) of the rotor core 22 with respect to the rotary shaft 21 is adjusted. In other words, each of a length difference between the length L1 of the key section 35 and the groove depth H1 of the key groove section 33 and a length difference between the groove depth H2 of the dovetail groove section 34 and the length L2 of the dovetail protrusion 36 serves as an adjusting allowance by which a position (a protrusion length) of the rotor core 22 with respect to the rotary shaft 21 is adjusted.

In addition, the gaps S are filled with the filler J. That is, the gaps S have a role of absorbing a manufacturing error of the dovetail groove section 34 and the dovetail protrusion 36 and have a function as a filling section that is filled with the filler J.

Further, a filling timing of the filler J may be after the convex sections 32 of the rotor cores 22 are fitted into the concave sections 31 of the rotary shaft 21, and the convex sections 32 may be fitted into the concave sections 31 in a state in which the filler J is previously applied to at least one of the concave sections 31 and the convex sections 32. In addition, an adhesive agent, a resin, or the like, is used as the filler J.

With such a configuration, in assembling the rotor cores 22 to the rotary shaft 21, first, a magnetized tool (not shown) in a cylindrical shape is disposed on a circle concentrically with the rotary shaft 21. Next, the rotor cores 22 are assembled to the rotary shaft 21 by fitting the convex sections 32 of the rotor cores 22 into the concave sections 31 of the rotary shaft 21.

Here, the rotor cores 22 serving as magnetic bodies are magnetically attracted to the tool. Then, since the rotor cores 22 are configured to be slidably movable with respect to the rotary shaft 21 in the radial direction, the tips 22b abut an inner circumferential surface of the tool. Accordingly, positioning of the rotor cores 22 in the radial direction can be precisely performed. Then, assembly of the rotor cores 22 to the rotary shaft 21 is completed.

Further, a timing at which the gaps S between the concave sections 31 and the convex sections 32 are filled with the filler J may be after or before the convex sections 32 are fitted into the concave sections 31. Before the convex sections 32 are fitted into the concave sections 31, even when the filler J is applied to the concave sections 31 or the convex sections 32, positioning of the rotor cores 22 is preferably completed before the filler J is cured.

In addition, the gaps S are formed between the legs 34b of the dovetail groove section 34 and the legs 36b of the dovetail protrusion 36, between the corner sections 34c of the dovetail groove section 34 and the corner sections 36c of the dovetail protrusion 36 and between the lower base 34a of the dovetail groove section 34 and the lower base 36a of the dovetail protrusion 36. The gap S has a role as an adjusting allowance by which a position (a protrusion length) of the rotor core 22 with respect to the rotary shaft 21 is adjusted.

Accordingly, according to the above-mentioned second embodiment, in addition to the same effects as the first embodiment, positioning of the rotor cores 22 can be more precisely performed. That is, a protrusion length of the rotor core 22 with respect to the rotary shaft 21 can be adjusted while restricting movement of the rotor cores 22 with respect to the rotary shaft 21 in the circumferential direction by the key groove section 33 and the key section 35. As a result, a variation in protrusion length of the rotor cores 22 with respect to the rotary shaft 21 can be suppressed as much as possible.

Accordingly, the air gaps G between the tips 22b of the rotor cores 22 and the tips of the tooth sections 14 of the stator core 12 can be precisely formed through the circumference, and motor performance can be improved.

In addition, according to the second embodiment, since a manufacturing error of the dovetail groove section 34 and the dovetail protrusion 36 can be absorbed by the gap S, an unnecessary load can be prevented from being applied to the key groove section 33 and the key section 35 and positioning of the rotor cores 22 with respect to the rotary shaft 21 can be more reliably performed.

Further, in the first and second embodiments, the case in which the center C1 of the radius of curvature R1 of the tip 22b of the rotor core 22 is eccentric with respect to the axial center C2 of the rotary shaft 21 by the predetermined interval δ1 has been described. However, it is not limited thereto but the tips 22b of the rotor cores 22 may be formed such that the center C1 of the radius of curvature R1 is disposed coaxially with the axial center C2 of the rotary shaft 21.

Third Embodiment

Next, a third embodiment will be described with reference to FIG. 6.

Figure 6:
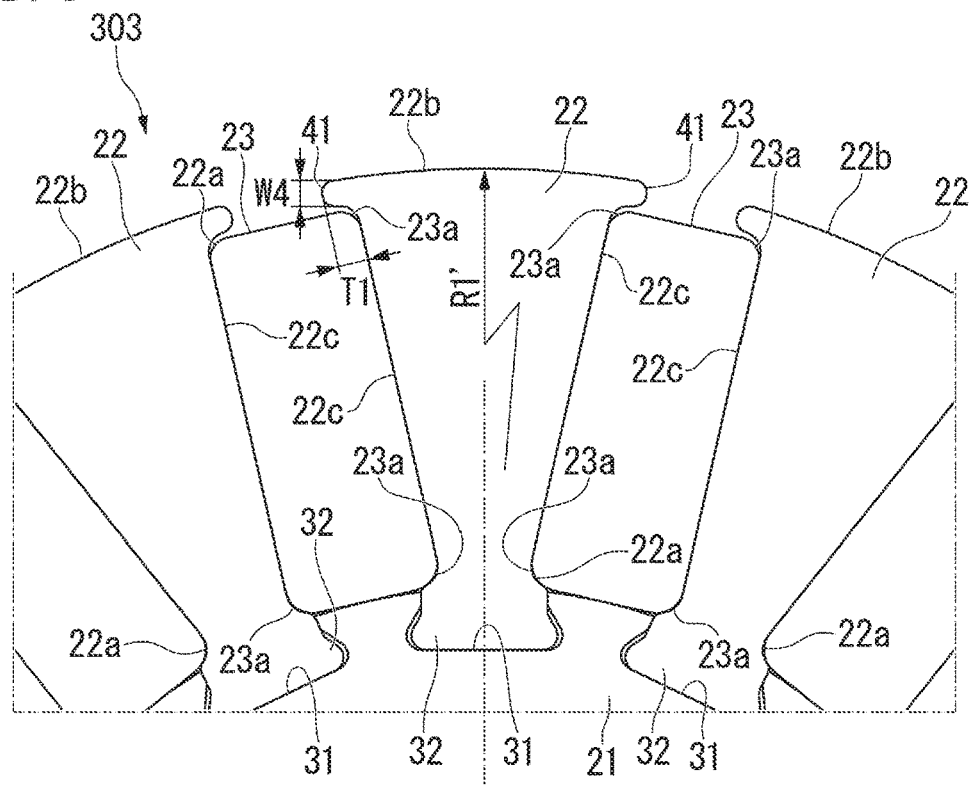
FIG. 6 is an enlarged schematic configuration view of a portion of a rotor according to a third embodiment of an aspect of the present invention.

FIG. 6 is an enlarged schematic configuration view of a portion of a rotor 303 according to the third embodiment, corresponding to FIG. 2.

As shown in FIG. 6, in the third embodiment, claw sections 41 are integrally formed at the tips 22b of the rotor cores 22 and edges of both sides in the circumferential direction. This is a difference between the first embodiment and the third embodiment.

The claw sections 41 have a function as a permanent magnet retaining section configured to prevent the permanent magnets 23 from falling out in the radial direction. Outer surfaces of the claw sections 41 in the radial direction, i.e., outer circumferential surfaces of the claw sections 41, are formed along arc shapes of the tips 22b of the rotor cores 22.

Here, in the first embodiment, the center C1 of the radius of curvature R1 of the tip 22b of the rotor core 22 is eccentric with respect to the axial center C2 of the rotary shaft 21 by the predetermined interval M (see FIG. 1). When this shape is employed in the rotor core 22 of the third embodiment, the claw sections 41 are formed in a shape extending inside in the radial direction between the neighboring rotor cores 22, and a length of the permanent magnet 23 in the radial direction is reduced to that extent. When the length of the permanent magnet 23 in the radial direction is reduced, an effective magnetic flux of the permanent magnets 23 may be decreased.

For this reason, a center of a radius of curvature R1' of the tip 22b of the rotor core 22 of the third embodiment is preferably set coaxially with the axial center C2 of the rotary shaft 21. Accordingly, a length of the permanent magnet 23 in the radial direction can be sufficiently secured, and an effective magnetic flux of the permanent magnets 23 can be sufficiently secured.

In addition, a protrusion height T1 of the claw section 41 in the circumferential direction and a width W4 of the claw section 41 in the radial direction are set to substantially the same dimension. The protrusion height T1 of the claw section 41 and the width W4 of the claw section 41 in the radial direction can secure stiffness of the claw section 41, and may be set to a dimension such that falling of the permanent magnets 23 in the radial direction can be prevented. For example, when the rotor core 22 is formed by stacking electromagnetic steel sheets, the protrusion height T1 of the claw section 41 and the width W4 of the claw section 41 in the radial direction may be set to about a plate thickness of the electromagnetic steel sheet. Accordingly, falling of the permanent magnets 23 in the radial direction can be reliably prevented, and stiffness of the claw sections 41 can be sufficiently secured.

In addition, each of the permanent magnet 23 has the round-chamfered sections 23a formed at places serving as four corners of the outer circumference when seen in the axial direction. Accordingly, the gaps S1 are slightly formed between outer ends of the permanent magnets 23 in the radial direction and the claw sections 41 of the rotor cores 22.

Meanwhile, the two round-chamfered sections 23a of inner ends of the permanent magnet 23 in the radial direction are disposed at the constricted sections 37 of the rotor cores 22. That is, the permanent magnets 23 are disposed between the constricted sections 37 of the rotor cores 22 and the claw sections 41 in the radial direction.

Here, as the inner ends of the permanent magnets 23 in the radial direction abut the outer circumferential surface of the rotary shaft 21, positioning in the radial direction is performed. In addition, as the round-chamfered sections 23a of the permanent magnets 23 are disposed at the constricted sections 37 of the rotor cores 22, positioning of the permanent magnets 23 in the radial direction is performed.

The outer ends of the permanent magnets 23 attached in this way in the radial direction are exposed because the rotor cores 22 are formed in a fan shape.

For this reason, while the magnetic flux tends to wrap around both ends of the permanent magnet 23 in the radial direction from one surface of the permanent magnet 23 in the thickness direction toward the other surface in the thickness direction (see an arrow Y1 in FIG. 2), wraparound of the magnetic flux is prevented because the magnetic path is cut off.

Meanwhile, since the inner ends of the permanent magnets 23 in the radial direction abut the rotary shaft 21 formed of a non-magnetic material, the magnetic path is cut off. For this reason, wraparound of the magnetic flux from one surface of the permanent magnet 23 in the thickness direction to the other surface in the thickness direction is prevented.

In this way, in the first embodiment, the claw sections 41 are integrally formed with both edges in the circumferential direction at the tip 22b of the rotor core 22. For this reason, for example, even when an adhesion error of the permanent magnets 23 with respect to the rotor cores 22 occurs, the permanent magnets 23 can be prevented from falling out in the radial direction of the rotor cores 22 due to the centrifugal force.

In addition, since positional precision of the permanent magnets 23 can be increased using the claw sections 41 of the rotor cores 22 or the constricted sections 37, motor properties can be improved.

Further, since falling of the permanent magnets 23 in the radial direction can be prevented by a simple structure that is referred to as the claw sections 41, an increase in size of the rotor cores 22 can be suppressed even when such a falling prevention function is provided.

In addition, as the inner ends of the permanent magnets 23 in the radial direction abut the outer circumferential surface of the rotary shaft 21, positioning in the radial direction is performed. For this reason, as the permanent magnets 23 are pushed toward the rotary shaft 21 from the outside in the radial direction, positioning of the permanent magnets 23 can be completed. Accordingly, positioning of the permanent magnets 23 can be easily performed.

Accordingly, according to the third embodiment, in addition to the same effect as the first embodiment using the claw sections 41 of the rotor cores 22 or the constricted sections 37, falling of the permanent magnets 23 in the radial direction can be reliably prevented.

In addition, since positional precision of the permanent magnets 23 can be increased, motor properties can be improved.

Further, since falling of the permanent magnets 23 in the radial direction can be prevented by a simple structure that is referred to as the claw sections 41, an increase in size of the rotor cores 22 can be suppressed even when such a falling prevention function is provided.

In addition, as the inner ends of the permanent magnets 23 in the radial direction abut the outer circumferential surface of the rotary shaft 21, and positioning in the radial direction is performed. For this reason, as the permanent magnets 23 are pushed toward the rotary shaft 21 from the outside in the radial direction, positioning of the permanent magnets 23 can be completed. Accordingly, positioning of the permanent magnets 23 is easily performed.

(First Variant of Third Embodiment)

Next, a first variant of the third embodiment will be described with reference to FIG. 7 and FIG. 8.

Figure 7:
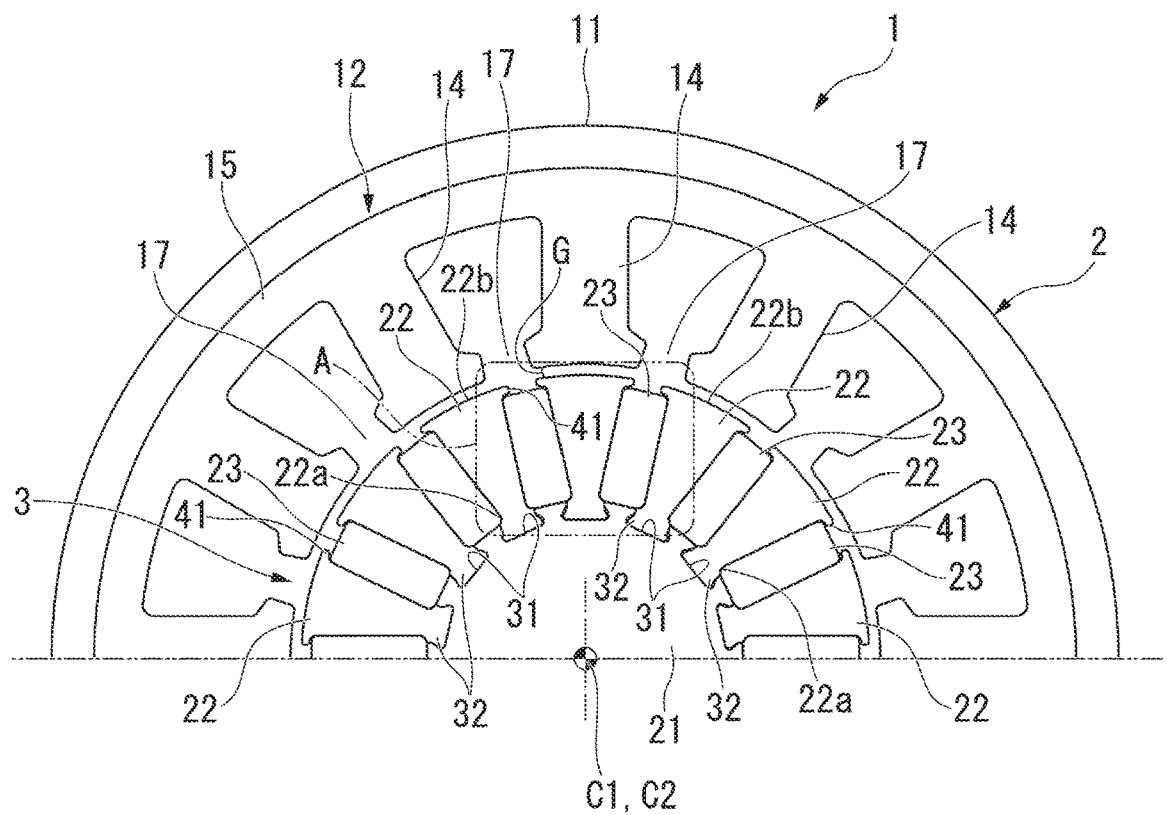
FIG. 7 is a schematic configuration view of a brushless motor according to a first variant of the third embodiment of the aspect of the present invention.

FIG. 7 is a schematic configuration view of a brushless motor according to the third embodiment of the aspect of the present invention. FIG. 8 is an enlarged view of a portion A of FIG. 7.

Figure 8:
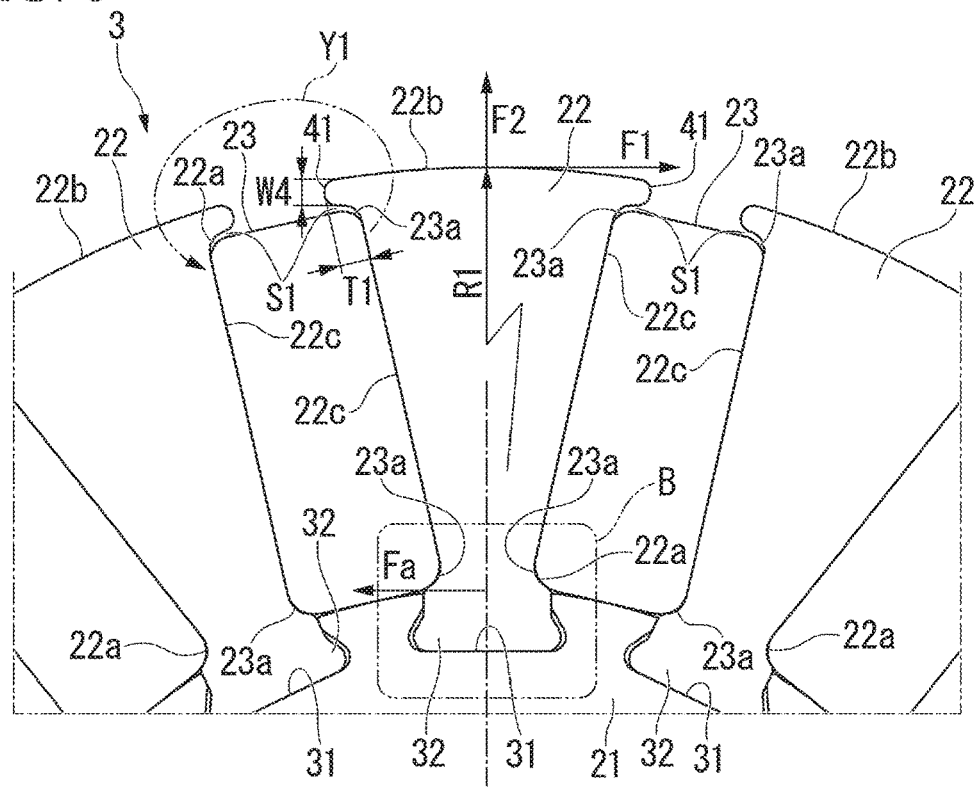
FIG. 8 is an enlarged view of a portion A of FIG. 7.

As shown in FIG. 7 and FIG. 8, the tip 22b of the rotor core 22 and the center C1 of the radius of curvature R1 of the outer circumferential surface of the claw section 41 are set coaxially with the axial center C2 of the rotary shaft 21. This is a difference between the third embodiment and the first variant thereof.

In the first variant of the third embodiment, the tip 22b of the rotor core 22 and the center C1 of the radius of curvature R1 of the outer circumferential surface of the claw section 41 are set coaxially with the axial center C2 of the rotary shaft 21.

Here, provisionally, when the center C1 of the radius of curvature R1 of the tip 22b of the rotor core 22 is eccentric with respect to the axial center C2 of the rotary shaft 21 by the predetermined interval, the claw sections 41 have a shape extending inside in the radial direction between the neighboring rotor cores 22. Then, a length of the permanent magnet 23 in the radial direction is reduced to that extent. When the length of the permanent magnet 23 in the radial direction is reduced, effective magnetic flux of the permanent magnets 23 may be decreased.

However, as the tip 22b of the rotor core 22 and the center C1 of the radius of curvature R1 of the outer circumferential surface of the claw section 41 are set coaxially with the axial center C2 of the rotary shaft 21, extending of the claw sections 41 inside in the radial direction between the neighboring rotor cores 22 can be suppressed as much as possible. For this reason, a length of the permanent magnet 23 in the radial direction can be sufficiently secured, and effective magnetic flux of the permanent magnet 23 can be sufficiently secured.

(Second Variant of Third Embodiment)

Next, a second variant of the third embodiment will be described with reference to FIG. 9. Further, the same aspects as the above-mentioned embodiments are designated by the same reference numerals and description thereof will be omitted.

Figure 9:
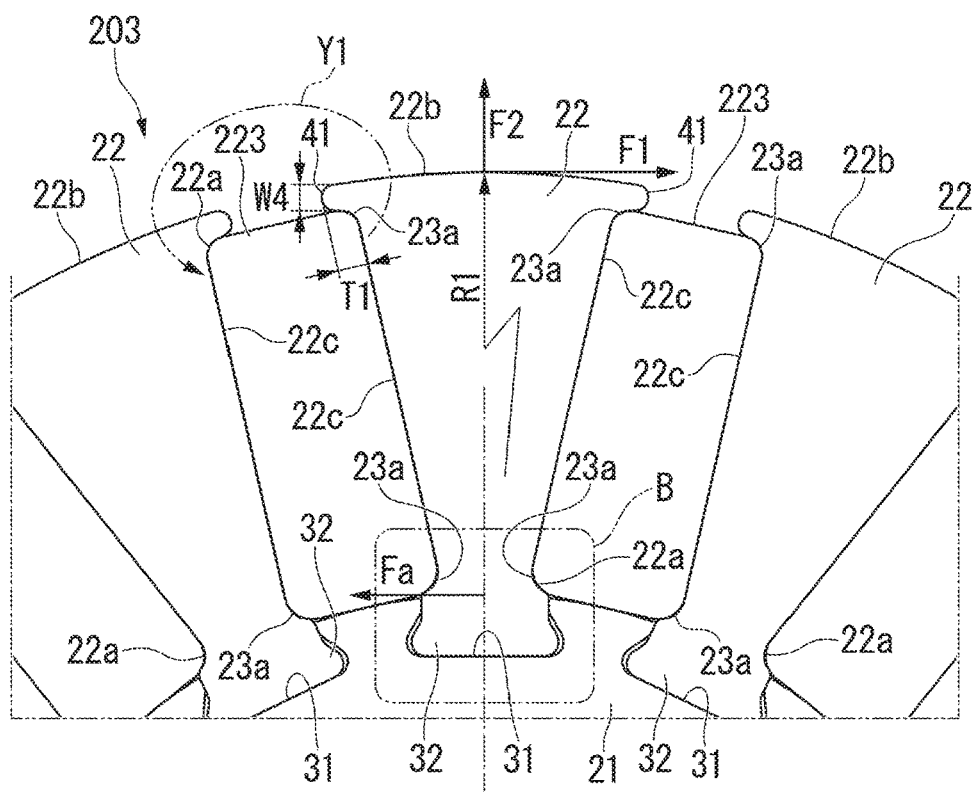
FIG. 9 is an enlarged view of a major part of a rotor according to a second variant of the third embodiment of the aspect of the present invention.

FIG. 9 is an enlarged view of a major part of the rotor 203 according to the second variant of the third embodiment, corresponding to FIG. 8 of the first variant of the third embodiment.

As shown in FIG. 9, the second variant of the third embodiment is distinguished from the first variant of the third embodiment in that, while the gap 51 is slightly formed between the outer end of the permanent magnet 23 in the radial direction and the claw section 41 of the rotor core 22 in the first variant of the third embodiment, permanent magnets 223 of the second variant of the third embodiment are formed such that outer ends of the permanent magnets 23 in the radial direction abut the claw sections 41 of the rotor cores 22.

Accordingly, according to the second variant of the third embodiment, in addition to the same effect as the first variant of the third embodiment, even when a centrifugal force that acts upon rotation of the rotor 203 is applied to the permanent magnets 223, the permanent magnets 223 can be prevented from deviating outward in the radial direction. For this reason, quality of the rotor 203 can be stabilized.

Further, in the third embodiment (including the first variant and the second variant), the case in which the claw sections 41 are integrally formed with both edges in the circumferential direction at the tip 22b of the rotor core 22 has been described. However, it is not limited thereto but the claw sections 41 may be formed with at least one of both edges in the circumferential direction at the tip 22b of the rotor core 22. In this case, the claw sections 41 are preferably disposed such that falling of all of the permanent magnets 23 in the radial direction can be prevented by the claw sections 41.

In addition, the claw sections 41 may not be integrally formed with the rotor cores 22, or the claw sections 41 may be formed separately from the rotor cores 22.

Further, the shape of the claw sections 41 is not limited to the shape of the third embodiment and may be a shape capable of preventing falling of the permanent magnets 23 or 223 in the radial direction.

In addition, the claw sections 41 may not be integrally formed with the rotor cores 22 and the claw sections 41 may be formed separately from the rotor cores 22. Further, the shape of the claw sections 41 is not limited to the shape of the above-mentioned embodiment but may be a shape capable of preventing falling of the permanent magnets 23 or 223 in the radial direction.

In addition, in the above-mentioned embodiment, the case in which the outer surfaces of the claw sections 41 in the radial direction, i.e., the outer circumferential surfaces of the claw sections 41, are formed in an arc shape of the tips 22b of the rotor cores 22 has been described. The case in which the tip 22b of the rotor core 22 and the center C1 of the radius of curvature R1 of the outer circumferential surface of the claw section 41 are set coaxially with the axial center C2 of the rotary shaft 21 has been described. However, it is not limited thereto but at least the center of the radius of curvature of the outer circumferential surface of the claw section 41 may be set coaxially with the axial center C2 of the rotary shaft 21.

In this case, for example, the center of the radius of curvature of the tip 22b of the rotor core 22 deviates outward from the axial center C2 of the rotary shaft 21 in the radial direction. In this configuration, the air gap G between the tip 22b of the rotor core 22 and the tip of the tooth section 14 of the stator core 12 can be gradually increased from the center of the tip 22b in the circumferential direction toward the outside in the circumferential direction of the tip 22b. For this reason, a variation in magnetic flux on the outer circumferential surface of the rotor cores 22 in the circumferential direction can be smoothed as much as possible, and a cogging torque can be decreased.

Fourth Embodiment

Next, a fourth embodiment will be described with reference to FIG. 10 and FIG. 11.

Figure 10:
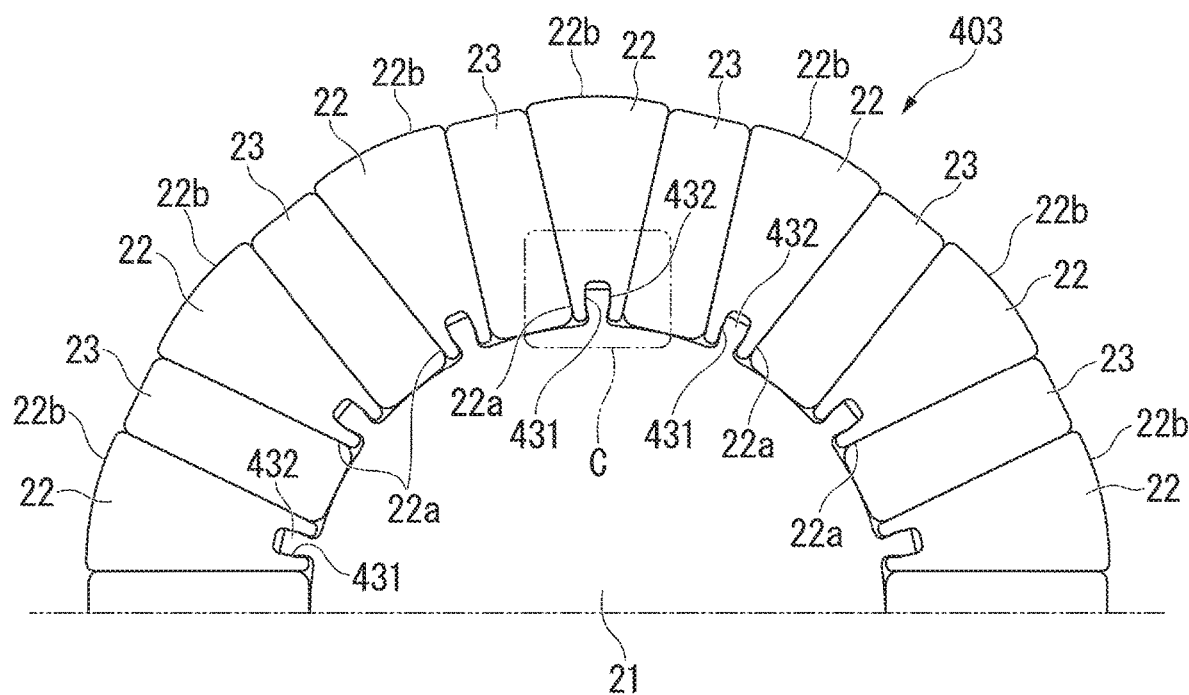
FIG. 10 is a schematic configuration view of a rotor according to a fourth embodiment of an aspect of the present invention.

FIG. 10 is a schematic configuration view of a rotor 403 according to the fourth embodiment.

As shown in FIG. 10, the fourth embodiment is distinguished from the first embodiment in that, while the concave section 31 is formed in the rotary shaft 21 and the convex section 32 is formed at the rotor cores 22 in the first embodiment, a convex section 432 is formed at the rotary shaft 21 and a concave section 431 is formed in the rotor core 22 in the fourth embodiment.

Figure 11:
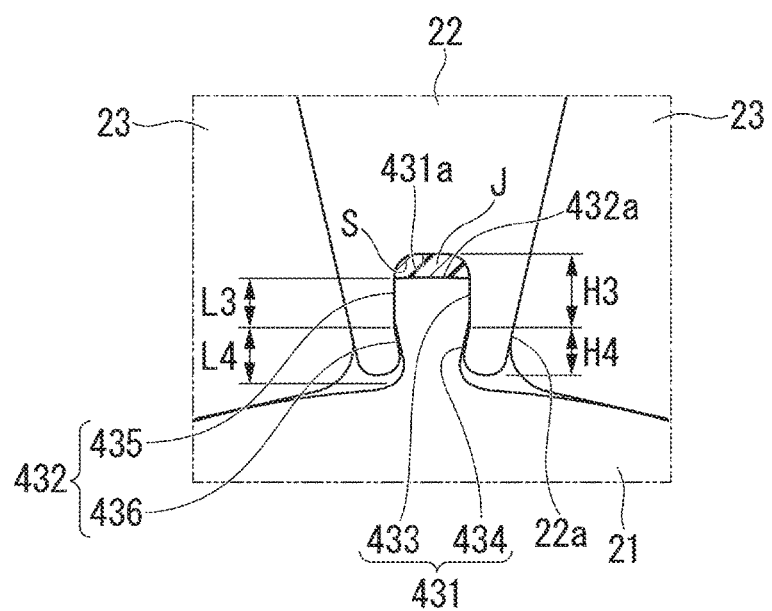
FIG. 11 is an enlarged view of a portion C of FIG. 10.

FIG. 11 is an enlarged view of a portion C of FIG. 10.

As shown in FIG. 11, in the concave section 431 formed in the base end 22a of the rotor core 22, a dovetail groove section 434 is formed at an opening side, and a key groove section 433 is formed outside the dovetail groove section 434 in the radial direction. The dovetail groove section 434 is formed in a shape that widens to the end such that a groove width is gradually increased from the opening side toward the outside in the radial direction. In other words, the dovetail groove section 434 is formed in a substantial isosceles trapezoidal shape when seen in a plan view in the axial direction. A width of the key groove section 433 in the circumferential direction is set to be equal to a length of a lower base of the dovetail groove section 434.

Meanwhile, the convex section 432 formed at the outer circumferential surface of the rotary shaft 21 has a dovetail protrusion 436 and a key section 435 that are sequentially disposed from the outer circumferential surface of rotary shaft 21 and integrally formed therewith to correspond to the concave section 431. A width of the key section 435 is set to substantially the same width as the key groove section 433.

Even in the case of the above-mentioned configuration, the same effect as in the first embodiment can be exhibited.

In addition, a groove depth H3 of the key groove section 433 of the concave section 431 is set to be larger than a length L3 of the key section 435 of the convex section 432, and a length L4 of the dovetail protrusion 436 of the convex section 432 is set to be larger than a groove depth H4 of the dovetail groove section 434 of the concave section 431. Further, a gap S is formed between a bottom surface 431a of the concave section 431 and a tip 432a of the convex section 432. The gap is filled with the filler J.

With such a configuration, the rotor cores 22 are slightly slidably movable with respect to the rotary shaft 21 in the radial direction. The gap S formed between the concave section 431 and the convex section 432 has a role as an adjusting allowance by which a position (a protrusion length) of the rotor core 22 with respect to the rotary shaft 21 is adjusted. In other words, each of a length difference between the groove depth H3 of the key groove section 433 and the length L3 of the key section 435 and a length difference between the length L4 of the dovetail protrusion 436 and the groove depth H4 of the dovetail groove section 434 serves as an adjusting allowance by which a position (a protrusion length) of the rotor core 22 with respect to the rotary shaft 21 is adjusted.

Accordingly, according to the fourth embodiment, the same effect as the second embodiment can be exhibited.

Further, the present invention is not limited to the above-mentioned embodiments but various modifications may be added to the above-mentioned embodiments without departing from the scope of the present invention.

For example, in the above-mentioned first to third embodiments, the case in which the key groove section 33 is formed at the opening side of the concave section 31 and the dovetail groove section 34 is formed inside the key groove section 33 in the radial direction has been described. In addition, the case in which the convex section 32 is formed to correspond to the shape of the concave section 31 has been described. However, it is not limited thereto but positions at which the key groove section 33 and the dovetail groove section 34 are formed may be reversed. In this case, the convex section 32 corresponding to the shape of the concave section 31 is formed.

In addition, for example, in the second embodiment, the case in which the length L1 of the key section 35 of the convex section 32 is set to be larger than the groove depth H1 of the key groove section 33 of the concave section 31 and the groove depth H2 of the dovetail groove section 34 of the concave section 31 is set to be larger than the length L2 of the dovetail protrusion 36 of the convex section 32 has been described. The case in which each of a length difference between the length L1 of the key section 35 and the groove depth H1 of the key groove section 33 and a length difference between the groove depth H2 of the dovetail groove section 34 and the length L2 of the dovetail protrusion 36 serves as an adjusting allowance by which a position (a protrusion length) of the rotor core 22 with respect to the rotary shaft 21 is adjusted has been described.

In addition, in the fourth embodiment, the case in which the groove depth H3 of the key groove section 433 of the concave section 431 is set to be larger than the length L3 of the key section 435 of the convex section 432 and the length L4 of the dovetail protrusion 436 of the convex section 432 is set to be larger than the groove depth H4 of the dovetail groove section 434 of the concave section 431 has been described. The case in which each of a length difference between the groove depth H3 of the key groove section 433 and the length L3 of the key section 435 and a length difference between the length L4 of the dovetail protrusion 436 and the groove depth H4 of the dovetail groove section 434 serves as an adjusting allowance by which a position (a protrusion length) of the rotor core 22 with respect to the rotary shaft 21 is adjusted has been described.

However, it is not limited thereto but it will be acceptable as long as an adjusting allowance within which movement of the convex section 32 or 432 in the concave section 31 or 431 in the radial direction is formed in at least one of the concave section 31 or 431 and the convex section 32 or 432.

Similarly, the concave section 431 of the fourth embodiment may also be formed such that the key groove section 433 and the dovetail groove section 434 are reversed. Even in this case, the convex section 432 corresponding to the shape of the concave section 431 is formed.

In addition, in the above-mentioned first to third embodiments, the case in which the constricted section 37 is formed at the rotor core 22 and the round-chamfered section 23a of the permanent magnet 23 is disposed at the constricted section 37 has been described. The case in which the constricted section 37 of the rotor core 22 functions as a rotor core retaining section configured to prevent the rotor core 22 from falling out in the radial direction has been described. However, the rotor core retaining section is not limited to the constricted section 37 of the rotor core 22, and a member configured to prevent the rotor core 22 from falling out in the radial direction may be provided at the rotor core 22.

Further, in the above-mentioned embodiments, the case in which the rotary shaft 21 is formed of, for example, an aluminum sintered material has been described. However, it is not limited thereto but a range in which at least the concave section 31 or 431 of the outer circumferential surface can be formed may be configured by the non-magnetic body.

In addition, the rotary shaft 21 may be formed of, for example, a resin, instead of the aluminum sintered material. When the rotary shaft 21 is formed of a resin, the rotor core 22 can be positioned in a mold and the rotary shaft 21 may be formed by a resin mold.

In addition, the embodiments may be combined. For example, the second embodiment and the third embodiment may be combined and the claw section 41 of the third embodiment may be formed at the rotor core 22 of the second embodiment.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A rotor comprising:
   a rotary shaft having a non-magnetic body formed at least at an outer circumferential surface thereof;
   a plurality of rotor cores that is attached to the outer circumferential surface of the rotary shaft and that is radially disposed; and
   a plurality of permanent magnets disposed between the plurality of rotor cores,
   wherein a concave section extending in an axial direction is formed in any one of the non-magnetic body and a base end of the rotor core, and a convex section configured to fit into the concave section is formed at the other one of the non-magnetic body and the base end of the rotor core,
   the concave section is formed by a key groove section and a dovetail groove section in communication with each other, the key groove section being formed so that surfaces thereof facing to each other in a circumferential direction are parallel with each other, the dovetail groove section being formed to have a shape that widens inward or outward in a radial direction,
   the convex section is formed by a key section configured to fit into the key groove section and a dovetail protrusion configured to fit into the dovetail groove section, the key section and the dovetail protrusion being integrally formed with each other,
   a gap is formed between the dovetail groove section and the dovetail protrusion in the circumferential direction,
   a retaining section configured to prevent the rotor core from falling from the rotary shaft in the radial direction is formed at the rotor core, the retaining section is a constricted section formed at a root portion of the convex section of the rotor core such that a width in the circumferential direction is reduced to be narrower than the key section of the convex section, and corner sections of the permanent magnet are disposed at the constricted section.

2. The rotor according to claim 1,
wherein the gap is filled with a filler.

3. The rotor according to claim 1,
wherein the concave section is formed at the non-magnetic body,
the key groove section is formed at an opening side of the concave section, and
the dovetail groove section is formed at an inner side of the key groove section in the radial direction.

4. The rotor according to claim 1,
wherein an adjusting allowance, which allows a movement of the convex section in the radial direction inside the concave section, is formed at least at one of the concave section and the convex section.

5. The rotor according to claim 4,
wherein a length of the key section is set to be larger than a groove depth of the key groove section,
a groove depth of the dovetail groove section is set to be larger than a protrusion height of the dovetail protrusion, and
each of a length difference between the length of the key section and the groove depth of the key groove section and a length difference between the groove depth of the dovetail groove section and the protrusion height of the dovetail protrusion serves as the adjusting allowance.

6. A motor comprising:
the rotor according to claim 5; and
a stator formed to surround the rotor and on which a winding is wound.

7. The rotor according to claim 4,
wherein a groove depth of the key groove section is set to be larger than a length of the key section,
a protrusion height of the dovetail protrusion is set to be larger than a groove depth of the dovetail groove section, and
each of a length difference between the groove depth of the key groove section and the length of the key section and a length difference between the protrusion height of the dovetail protrusion and the groove depth of the dovetail groove section serves as the adjusting allowance.

8. A motor comprising:
the rotor according to claim 7; and
a stator formed to surround the rotor and on which a winding is wound.

9. The rotor according to claim 1,
wherein a permanent magnet retaining section configured to prevent the permanent magnet from falling out in the radial direction is formed at a tip of the rotor core.

10. The rotor according to claim 9,
wherein a claw section extending in the circumferential direction is formed at least at one of both edges in the circumferential direction at a tip of the rotor core, and
the claw section functions as the permanent magnet retaining section.

11. The rotor according to claim 10,
wherein an outer circumferential surface of the claw section is formed concentrically with an outer circumferential surface of the rotary shaft.

12. The rotor according to claim 11,
wherein an outer end of the permanent magnet in the radial direction abuts the claw section.

13. A motor comprising:
the rotor according to claim 12; and
a stator formed to surround the rotor and on which a winding is wound.

14. The rotor according to claim 11,
wherein an inner end of the permanent magnet in the radial direction abuts an outer circumferential surface of the rotary shaft.

15. A motor comprising:
the rotor according to claim 14; and
a stator formed to surround the rotor and on which a winding is wound.

16. A motor comprising:
the rotor according to claim 1; and
a stator formed to surround the rotor and on which a winding is wound.

17. A rotor comprising:
a rotary shaft having a non-magnetic body formed at least at an outer circumferential surface thereof;
a plurality of rotor cores that is attached to the outer circumferential surface of the rotary shaft and that is radially disposed; and
a plurality of permanent magnets disposed between the plurality of rotor cores,
wherein a concave section extending in an axial direction is formed in any one of the non-magnetic body and a base end of the rotor core, and a convex section configured to fit into the concave section is formed at the other one of the non-magnetic body and the base end of the rotor core,
the concave section is formed by a key groove section and a dovetail groove section in communication with each other, the key groove section being formed so that surfaces thereof facing to each other in a circumferential direction are parallel with each other, the dovetail groove section being formed to have a shape that widens inward or outward in a radial direction,
the convex section is formed by a key section configured to fit into the key groove section and a dovetail protrusion configured to fit into the dovetail groove section, the key section and the dovetail protrusion being integrally formed with each other,
a gap is formed between the dovetail groove section and the dovetail protrusion in the circumferential direction,
an adjusting allowance, which allows a movement of the convex section in the radial direction inside the concave section, is formed at least at one of the concave section and the convex section,
a groove depth of the key groove section is set to be larger than a length of the key section,
a protrusion height of the dovetail protrusion is set to be larger than a groove depth of the dovetail groove section, and
each of a length difference between the groove depth of the key groove section and the length of the key section and a length difference between the protrusion height of the dovetail protrusion and the groove depth of the dovetail groove section serves as the adjusting allowance.

18. The rotor according to claim 17,
wherein the gap is filled with a filler.

19. The rotor according to claim 17,
wherein the concave section is formed at the non-magnetic body, the key groove section is formed at an opening side of the concave section, and the dovetail groove section is formed at an inner side of the key groove section in the radial direction.

20. A motor comprising:

the rotor according to claim 17; and a stator formed to surround the rotor and on which a winding is wound.

* * * * *